(12) United States Patent
Avedisov et al.

(10) Patent No.: US 12,172,668 B2
(45) Date of Patent: Dec. 24, 2024

(54) VEHICLES AND METHODS FOR SHARING SENSOR DATA BASED ON CRITICALITY

(71) Applicant: Toyota Motor Engineering & Manufacturing North America, Inc., Plano, TX (US)

(72) Inventors: Sergei S. Avedisov, Los Gatos, CA (US); Onur Altintas, Mountain View, CA (US); Takamasa Higuchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 382 days.

(21) Appl. No.: 17/555,735

(22) Filed: Dec. 20, 2021

(65) Prior Publication Data

US 2023/0192117 A1    Jun. 22, 2023

(51) Int. Cl.
*B60W 30/095* (2012.01)
*B60W 40/105* (2012.01)
*B60W 40/11* (2012.01)
*B60W 60/00* (2020.01)
*G07C 5/00* (2006.01)

(52) U.S. Cl.
CPC ........ *B60W 60/001* (2020.02); *B60W 40/105* (2013.01); *B60W 40/11* (2013.01); *G07C 5/008* (2013.01)

(58) Field of Classification Search
CPC ............ B60W 30/09; B60W 50/0097; B60W 60/001; B60W 60/00276; B60W 2556/65; G05D 1/0291; G05D 1/0293; G08G 1/166; H04W 4/46
USPC .......................................................... 701/23
See application file for complete search history.

(56) References Cited

U.S. PATENT DOCUMENTS

| | | | | |
|---|---|---|---|---|
| 7,840,331 B2* | 11/2010 | Yoshioka | ............... | G08G 1/164 340/995.13 |
| 8,520,695 B1* | 8/2013 | Rubin | ................... | H04W 72/30 370/445 |

(Continued)

OTHER PUBLICATIONS

Xiaofeng Liu and Arunita Jaekel; Electronics; Congestion Control in V2V Safety Communication: Problem, Analysis, Approaches; vol. 8, pp. 540-563, 2019.

(Continued)

*Primary Examiner* — Logan M Kraft
*Assistant Examiner* — Joshua Campbell
(74) *Attorney, Agent, or Firm* — Dinsmore & Shohl LLP

(57) ABSTRACT

In accordance with one embodiment of the present disclosure, a vehicle includes a controller programmed to perform operations including collecting information about an unconnected vehicle, receiving messages from another connected vehicle, identifying a scenario of the another connected vehicle being in conflict with the vehicle or the unconnected vehicle at a future time based on the messages from the another connected vehicle and the information about the unconnected vehicle, and, in response to identifying the scenario of the another connected vehicle being in conflict with the vehicle or the unconnected vehicle at the future (Continued)

time, transmitting a first message including the information about the unconnected vehicle to the another connected vehicle.

20 Claims, 8 Drawing Sheets

(56) References Cited

U.S. PATENT DOCUMENTS

| | | | | |
|---|---|---|---|---|
| 8,874,267 | B1* | 10/2014 | Dolgov | G08G 1/16 |
| | | | | 701/28 |
| 9,501,935 | B2* | 11/2016 | Kastner | B60W 30/09 |
| 10,796,501 | B2* | 10/2020 | Cheng | G07C 5/008 |
| 2012/0290198 | A1* | 11/2012 | Firl | G08G 1/0133 |
| | | | | 701/117 |
| 2014/0051346 | A1* | 2/2014 | Li | H04W 4/46 |
| | | | | 455/3.01 |
| 2019/0018419 | A1* | 1/2019 | Lee | G08G 1/096708 |
| 2019/0278280 | A1* | 9/2019 | Imai | B60W 30/09 |
| 2019/0291728 | A1* | 9/2019 | Shalev-Shwartz | |
| | | | | B60W 30/18154 |
| 2019/0325751 | A1* | 10/2019 | Altintas | G05D 1/0077 |
| 2019/0329777 | A1* | 10/2019 | Rajab | B60W 40/04 |
| 2020/0086789 | A1* | 3/2020 | Nowakowski | B60R 1/24 |
| 2020/0164874 | A1* | 5/2020 | Zhao | B60W 30/18159 |
| 2021/0109545 | A1* | 4/2021 | Lopez | G05D 1/0291 |

OTHER PUBLICATIONS

Avedisov et al.; "Perceived Safety: A New Metric for Evaluating Safety Benefits of Collective Perception for Connected Road Users," 2020 IEEE Vehicular Networking Conference (VNC), Dec. 16-18, 2020, pp. 1-4.

Mao Shan et al.; "Demonstrations of Cooperative Perception: Safety and Robustness in Connected and Automated Vehicle Operations," Sensors, vol. 21, pp. 200-221, 2021.

Sherin Abdel Hamid et al.; "Vehicle as a Resource (VaaR)," IEEE Network, vol. 29, No. 1, pp. 12-17, Jan.-Feb. 2015.

Weixia Li et al.; "Development and Evaluation of High-Speed Differential Warning Application Using Vehicle-to-Vehicle Communication," Transportation Research Record, vol. 2621, pp. 81-91, 2017.

* cited by examiner

VEHICLES AND METHODS FOR SHARING SENSOR DATA BASED ON CRITICALITY

TECHNICAL FIELD

The present disclosure relates to vehicle collision avoidance, and more particularly to generating suggested trajectories to avoid potential collisions on predicted trajectories.

BACKGROUND

Vehicles may be equipped with sensors to help them perceive their environment. Sensors such as cameras, LIDAR sensors, and the like allow vehicles to monitor their environment for nearby objects. With the information from the sensors, a vehicle or a driver of the vehicle may determine whether there are potential conflicts with the nearby objects. For example, a camera on a vehicle may capture an image of a neighboring vehicle, and the driver or the vehicle may react to the neighboring vehicle.

However, onboard sensors are limited in their ability to perceive the environment. Much like the eyes of the driver, sensor views are limited in range and breadth of coverage. Sensors also may have their views obstructed by other objects, which may prevent sensors from benefitting from the full range and breadth of their coverage. Vehicles with sensors may communicate their perceptions to other nearby vehicles. However, this solution may place too much stress on vehicle and network hardware when performed at scale, which may cause delays with other connected systems.

Therefore, intelligent strategies for sharing sensor information between vehicles on an as-needed basis are desired.

SUMMARY

In accordance with one embodiment of the present disclosure, a vehicle includes a controller. The controller is programmed to perform operations including collecting information about an unconnected vehicle, receiving messages from another connected vehicle, identifying a scenario of the another connected vehicle being in conflict with the vehicle or the unconnected vehicle at a future time based on the messages from the another connected vehicle and the information about the unconnected vehicle, and, in response to identifying the scenario of the another connected vehicle being in conflict with the vehicle or the unconnected vehicle at the future time, transmitting a first message including the information about the unconnected vehicle to the another connected vehicle.

In accordance with another embodiment of the present disclosure, a method includes collecting, with a sensor of a connected vehicle, information about an unconnected vehicle, receiving, with a network connectivity module of the connected vehicle, messages from another connected vehicle, identifying, with a controller of the connected vehicle, a scenario of the another connected vehicle being in conflict with the connected vehicle or the unconnected vehicle at a future time based on the messages from the another connected vehicle and the information about the unconnected vehicle, and, in response to identifying the scenario of the another connected vehicle being in conflict with the connected vehicle or the unconnected vehicle at the future time, transmitting, with the network connectivity module of the connected vehicle, a first message including the information about the unconnected vehicle to the another connected vehicle.

In accordance with yet another embodiment of the present disclosure, a non-transitory computer-readable medium having machine-readable instructions. The machine-readable instructions, when executed by a controller, cause the controller to perform operations including collecting, with a sensor of a connected vehicle, information about an unconnected vehicle, receiving, with a network connectivity module of the connected vehicle, messages from another connected vehicle, identifying, with the controller of the connected vehicle, a scenario of the another connected vehicle being in conflict with the connected vehicle or the unconnected vehicle at a future time based on the messages from the another connected vehicle and the information about the unconnected vehicle, and, in response to identifying the scenario of the another connected vehicle being in conflict with the connected vehicle or the unconnected vehicle at the future time, transmitting, with the network connectivity module of the connected vehicle, a first message including the information about the unconnected vehicle to the another connected vehicle.

Although the concepts of the present disclosure are described herein with primary reference to automobiles on roadways, it is contemplated that the concepts will enjoy applicability to any vehicle. For example, and not by way of limitation, it is contemplated that the concepts of the present disclosure may have applicability to boats on waterways.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include vehicles, methods, and non-transitory computer-readable mediums for sensor sharing based on criticality. In embodiments disclosed herein, an ego vehicle that is a connected vehicle may send messages to other connected vehicles to reduce awareness gaps of the sensors of the connected vehicles. The added awareness benefits of such messages come at a minimal cost to computational and network hardware because the ego vehicle may only send when there is an anticipated critical scenario caused by an anticipated awareness gap. Accordingly, an ego vehicle may identify awareness gaps that other (i.e., "remote") connected vehicles have by determining whether there are vehicles that are critical to the remote connected vehicles and whether there is a likelihood that the remote connected vehicles are not aware of the critical vehicles.

Connected vehicles may transmit messages to other nearby connected vehicles to convey information about the environment. The messages transmitted may be of classes including basic safety messages (BSM), sensor-detected object messages (SDOM), and maneuver messages (MM). SDMs are messages that include a notification that an assistance service is available. BSMs are messages that include current information, such as position, speed, size, static/dynamic information, and/or the like of the transmitter vehicle.

SDOMs are messages that contain information (e.g., sensor information) about objects detected by the transmitter vehicle. SDOMs may include relative positions, velocities, sizes (bounding boxes) as well as other dynamic and static data regarding detected objects. SDOMs may include, but are not limited to, Collective Perception Message (CPM) or Sensor Data Sharing Message (SDSM). MMs are messages that include future information, such as future position, future speed, future static/dynamic information, and/or the like of the transmitter vehicle. MMs may include, but not limited to, Maneuver Coordination Message (MCM) or Maneuver Sharing Coordination Message (MSCM). Proxy MMs are messages that contain future information and/or possible future information of an object detected by the transmitter vehicle.

Figure 1:
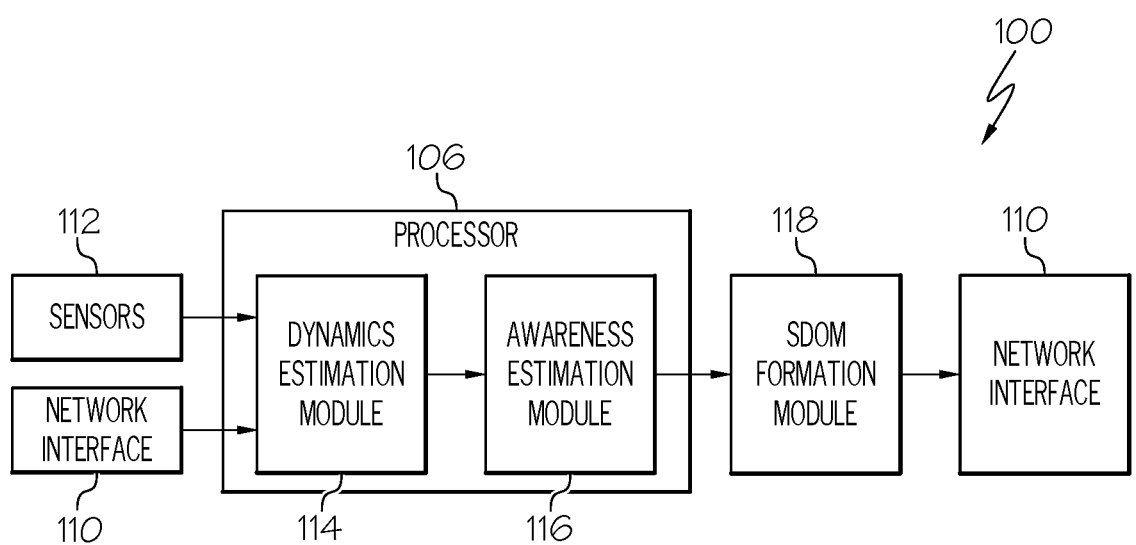
FIG. 1 depicts an illustrative workflow for criticality-based sensor sharing, according to one or more embodiments shown and described herein.

Referring now to FIG. 1, an illustrative workflow 100 for criticality-based sensor sharing is depicted. An ego vehicle may receive information about other vehicles from its onboard sensor modules 112 as well as from the sensors of remote connected vehicles communicating with the ego vehicle via the network interface module 110 of the ego vehicle. The remote connected vehicles may share with the ego vehicle information about vehicles that they perceive with their sensors as well as information about themselves.

The information about other vehicles from the sensor module 112 and the network interface module 110 may get passed to the dynamics estimation module 114, as which the processor 106 may be programmed to operate. The dynamics estimation module 114 is configured to generate a motion model of one or more vehicles up to a future time horizon based on the information about the vehicles for identifying one or more scenarios of one or more remote connected vehicles 122 being in conflict with the vehicles or the connected vehicle 102.

The information generated by the dynamics estimation module 114 may get passed to the awareness estimation module 116, as which the processor 106 may be programmed to operate. The awareness estimation module 116 is configured to determine an awareness gap of one or more remote connected vehicles 122 for identifying which scenarios are critical.

The SDOM formation module 118 may package the information output from the awareness estimation module 116 and/or the dynamics estimation module 114 into an SDOM format or any other equivalent standardized message. This may involve compressing, encoding, encrypting, and/or any other form of data manipulation to prepare the information for sending to other connected vehicles. The information is sent to other connected vehicles via the network interface module 110. The rate at which the information is sent may depend on the criticality of the critical scenario on which the information is based.

Figure 2:
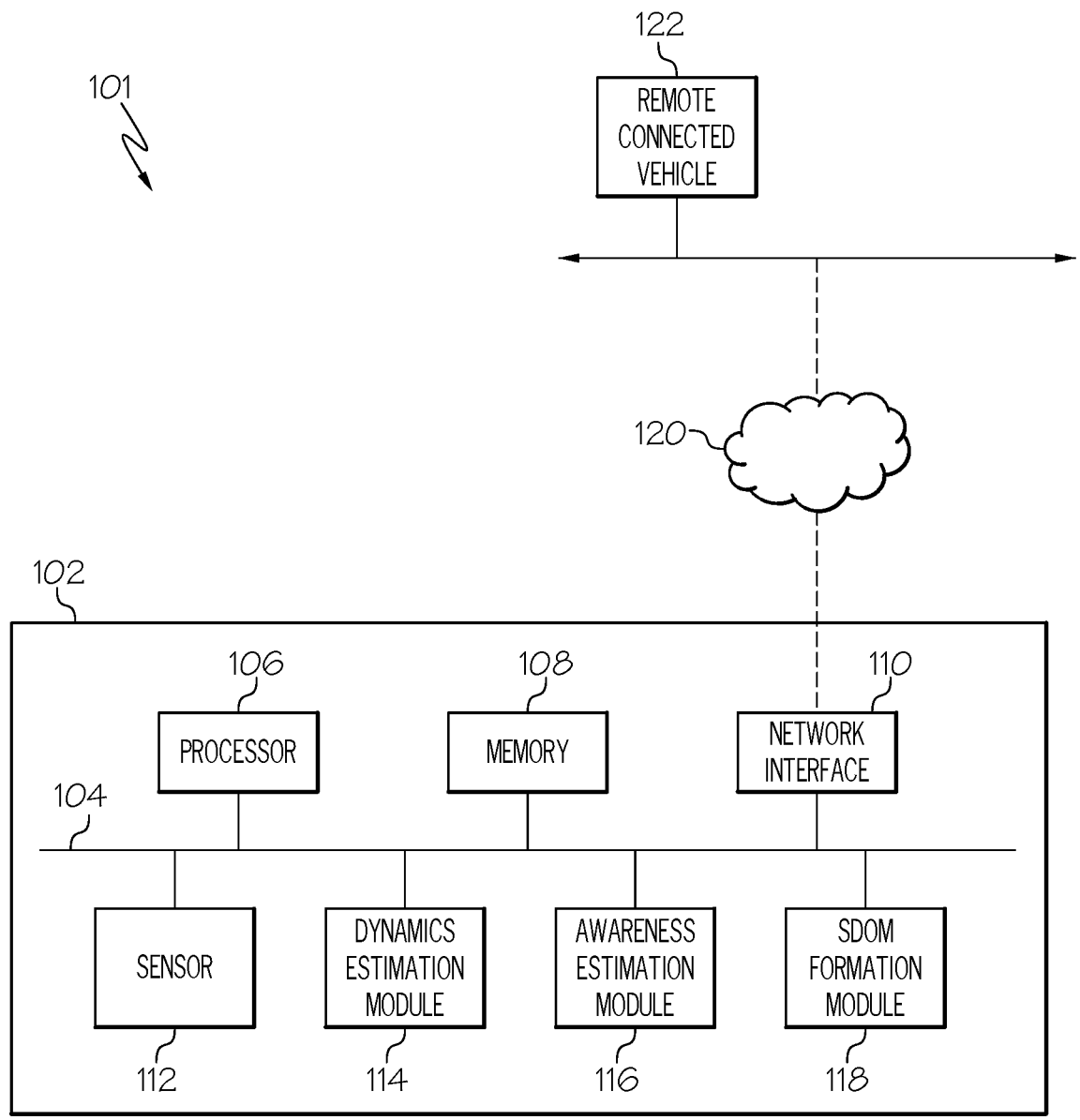
FIG. 2 depicts an illustrative connected vehicle, according to one or more embodiments shown and described herein.

Referring now to FIG. 2, an illustrative system 101 including an illustrative connected vehicle 102 is depicted. The connected vehicle 102 may be a terrestrial vehicle, an aquatic vehicle, an aerial vehicle, or any other passenger or non-passenger vehicle. In some embodiments, the connected vehicle 102 is an autonomous vehicle that navigates its environment with limited or no human input. The connected vehicle 102 may include a processor 106, a memory module 108, a sensor module 112, a network interface module 110, a dynamics estimation module 114, an awareness estimation module 116, and an SDOM formation module 118. The connected vehicle 102 also may include a communication path 104 that communicatively connects the various components of the connected vehicle 102.

The processor 106 may include one or more processors that may be any device capable of executing machine-readable and executable instructions. Accordingly, each of the one or more processors of the processor 106 may be a controller, an integrated circuit, a microchip, or any other computing device. The processor 106 is coupled to the communication path 104 that provides signal connectivity between the various components of the connected vehicle. Accordingly, the communication path 104 may communicatively couple any number of processors of the processor 106 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 104 may be formed from any medium that is capable of transmitting a signal such as, e.g., conductive wires, conductive traces, optical waveguides, and the like. In some embodiments, the communication path 104 may facilitate the transmission of wireless signals, such as Wi-Fi, Bluetooth®, Near-Field Communication (NFC), and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory module 108 is coupled to the communication path 104 and may contain one or more memory modules comprising RAM, ROM, flash memories, hard drives, or any device capable of storing machine-readable and executable instructions such that the machine-readable and executable instructions can be accessed by the processor 106. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory module 108. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory module 108 may contain instructions for performing methods described herein. The memory module 108 may also contain machine-readable instructions for identifying objects in sensor data.

The connected vehicle 102 also comprises a network interface module 110 that includes network connectivity hardware for communicatively coupling the connected vehicle 102 to other network-attached devices, such as connected vehicles, connected infrastructure, and the like. The network interface module 110 can be communicatively coupled to the communication path 104 and can be any device capable of transmitting and/or receiving data via a network 120 or other communication mechanisms. Accordingly, the network interface module 110 can include a communication transceiver for sending and/or receiving any wired or wireless communication. For example, the network connectivity hardware of the network interface module 110 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices.

The connected vehicle 102 may connect with one or more other connected vehicles and/or external processing devices (e.g., an edge server, a cloud server) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

The sensor module 112 is coupled to the communication path 104 and communicatively coupled to the processor 106. The sensor module 112 may include, e.g., LiDAR sensors, RADAR sensors, optical sensors (e.g., cameras), laser sensors, proximity sensors, location sensors, and the like. In embodiments, the sensor module 112 may monitor the surroundings of the connected vehicle 102 and may detect other vehicles and/or traffic infrastructure.

The dynamics estimation module 114 may be a hardware device coupled to the communication path 104 and communicatively coupled to the processor 106. The dynamics estimation module 114 may also or instead be a set of instructions contained in the memory module 108. The dynamics estimation module 114 is configured to generate a motion model of one or more vehicles (e.g., an unconnected vehicle) or objects (e.g., pedestrians, animals, cycles, scooters, robots, or any other moveable objects) up to a future time horizon based on the information about the vehicles for identifying one or more critical scenarios of one or more remote connected vehicles 122 being in conflict with the vehicles or the connected vehicle 102. For example, the dynamics estimation module 114 may receive information about other vehicles from the sensor module 112 and/or the network interface module 110, fuse the information together, predict the trajectory of each vehicle for a predetermined period of time, and select sets of vehicles that may conflict with each other based on their predicted trajectory. The dynamics estimation module may output the selected sets of vehicles and predicted motion of vehicles or objects.

The awareness estimation module 116 may be a hardware device coupled to the communication path 104 and communicatively coupled to the processor 106. The awareness estimation module 116 may also or instead be a set of instructions contained in the memory module 108. The awareness estimation module 116 is configured to determine an awareness gap of one or more remote connected vehicles 122. For example, the awareness estimation module 116 may receive information about other vehicles from the sensor module 112, messages about the remote connected vehicles 122 from the remote connected vehicles 122, and the output of the dynamics estimation module 114, then determine occlusion areas of the remote connected vehicles 122, and identify vehicles, objects and/or conflicts that may be found in the occlusion area.

The SDOM formation module 118 may be a hardware device coupled to the communication path 104 and communicatively coupled to the processor 106. The SDOM formation module 118 may also or instead be a set of instructions contained in the memory module 108. The SDOM formation module 118 is configured to package the information output from the awareness estimation module 116 and/or the dynamics estimation module 114 into an SDOM format or any other equivalent standardized message. Other similar modules may exist for other message formats.

The example system 101 may also remote connected vehicles 122. The remote connected vehicles 122 may be one or more connected vehicles that may be in remote communication with the connected vehicle 102 via network 120. The remote connected vehicles 122 may also be terrestrial vehicles, aquatic vehicles, aerial vehicles, or any other passenger or non-passenger vehicles. In some embodiments, the remote connected vehicles 122 include autonomous vehicles that navigate their environment with limited or no human input. The remote connected vehicles 122 may also include a processor, a memory module, a sensor module, a network interface module, a dynamics estimation module, an awareness estimation module, an SDOM formation module similar to those included in the connected vehicle 102. The remote connected vehicles 122 also may include a communication path that communicatively connects the various components of the remote connected vehicles 122.

Figure 3:
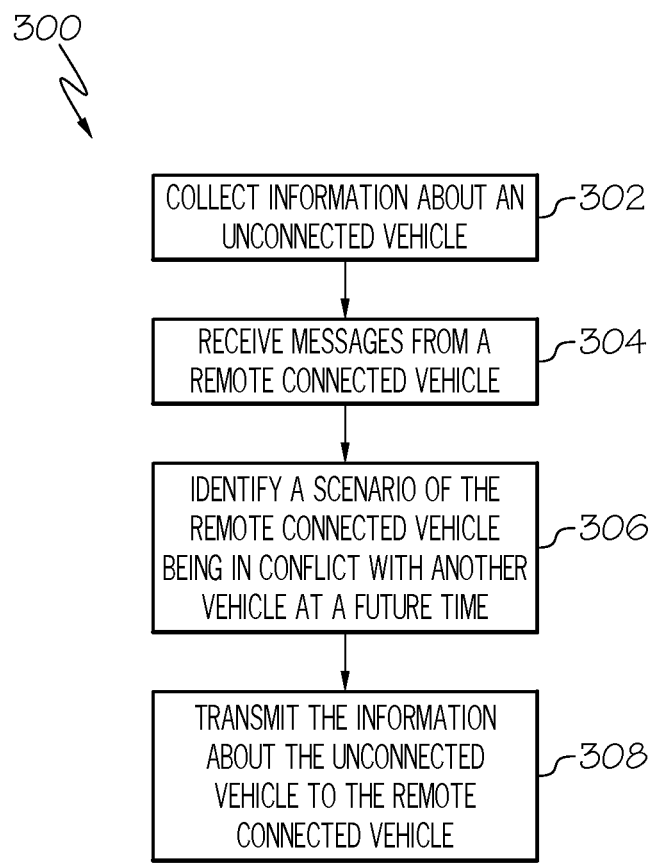
FIG. 3 depicts an illustrative method for criticality-based sensor sharing, according to one or more embodiments shown and described herein.

Referring now to FIG. 3, an illustrative method 300 for criticality-based sensor sharing is depicted. The method 300 may be performed by an ego vehicle, which may be a connected vehicle 102 that engages in workflow 100 described above. In block 302, information about one or more unconnected vehicles is collected. The information may be collected with one or more sensors of the ego vehicle. For example, a LIDAR sensor of the ego vehicle may identify a vehicle and determine its speed, direction, predicted trajectory, position, size, and/or any other attribute of the identified vehicle. The ego vehicle may determine the vehicle is an unconnected vehicle based on a lack of communication from the vehicle. For example, nearby connected vehicles may periodically send messages (e.g., BSMs) about themselves that the ego vehicle may receive. If the ego vehicle has not received messages from a vehicle, the ego vehicle may assume that the vehicle is unconnected. In some embodiments, the ego vehicle may also collect information about objects such as pedestrians, anmials, cycles, scooters, robots, or any other moveable objects.

In block 304, messages from another connected vehicle (a "remote connected vehicle") may be received. The messages may be received by a network connectivity module of the ego vehicle. For example, the remote connected vehicle may send and the ego vehicle may receive messages including objects perceived from one or more sensors of the remote connected vehicle. The remote connected vehicle may also identify a vehicle and determine its speed, direction, predicted trajectory, position, size, and/or any other attribute of the identified vehicle and send that all or some of that information to the ego vehicle.

In block 306, the ego vehicle may identify one or more critical scenarios of the remote connected vehicle. The critical scenarios may involve the remote connected vehicle being in conflict with the ego vehicle and/or one or more unconnected vehicles or objects at a future time. The ego vehicle may identify the one or more critical scenarios of the remote connected vehicle based on the messages from the remote connected vehicle received in block 304 and the information about the one or more unconnected vehicles or objects collected in block 302. Identifying the one or more critical scenarios will be discussed in more detail with regard to FIG. 4, below.

In block 308, the ego vehicle may transmit to the remote connected vehicle one or more messages in response to identifying the critical scenario of the remote connected vehicle being in conflict with the ego vehicle and/or one or more unconnected vehicles or objects at the future time. The messages may include information about the one or more unconnected vehicles or objects to the remote connected vehicle. The information may be the information from block 302.

In some embodiments, the ego vehicle may collect information about a second unconnected vehicle or a second object and determine whether the remote connected vehicle is likely going to be in conflict with the second unconnected vehicle. The ego vehicle may identify the one or more critical scenarios of the remote connected vehicle being in conflict with the second unconnected vehicle or the second object based on the received messages from the remote connected vehicle and the collected information about the one or more unconnected vehicles or objects. With critical scenarios having been identified for two unconnected vehicles or objects with the remote connected vehicle, the ego vehicle may determine a criticality level for each critical scenario. The level of criticality for a critical scenario may be based on one or more factors including the time of the critical scenario, attributes of the unconnected vehicles or objects, and/or response from the remote connected vehicle. For example, a critical scenario may be considered more critical if it is likely to occur sooner, if the unconnected vehicle or object involved is traveling faster, and/or if the scenario is likely to require a stronger reaction from the remote connected vehicle. Once criticality levels have been determined, the ego vehicle may send messages to the remote connected vehicle concerning each unconnected vehicle or object in an order based on which unconnected vehicle is likely to be involved in a critical scenario having the highest criticality level. For example, the ego vehicle may transmit a second message including information about the second unconnected vehicle to the remote connected vehicle, wherein the second message is transmitted before the first message in response to the criticality level of the second critical scenario being greater than the criticality level of the first critical scenario. It should be understood that the ordering of message transmission is not limited to two unconnected vehicles or objects and thus the ego vehicle can transmit any number of messages to the remote connected vehicle regarding any number of unconnected vehicles or objects.

In some embodiments, the ego vehicle may determine a criticality level for each critical scenario of the one or more scenarios determined in block 306 and determine a transmission rate of messages based on the criticality level. The level of criticality for a critical scenario may be based on one or more factors including the time of the critical scenario, attributes of the unconnected vehicles, and/or response from the remote connected vehicle. For example, a critical scenario may be considered more critical if it is likely to occur sooner, if the unconnected vehicle involved has a higher acceleration rate, and/or if the critical scenario is likely to require a stronger reaction from the remote connected vehicle. Messages about the unconnected vehicle likely to be involved in the one or more critical scenarios may be transmitted to the remote connected vehicle at a base rate (e.g., once per second). The transmission rate may be increased based on the criticality level of the critical scenario corresponding to the message being above a predetermined threshold level. Alternatively, the ego vehicle may determine the transmission rate of each message proportionally to the criticality level of the corresponding critical scenario and transmit each message according to the determined transmission rate. For example, a rate of transmission may be commensurate to the criticality level of the critical scenario. Assuming the critical scenario of the remote connected vehicle and the unconnected vehicle indicate a potential collision within 5 seconds, the ego vehicle may transmit at a higher rate within the 5 second period to ensure that the remote connected vehicle can react before the conflict.

In some embodiments, the ego vehicle may also generate a suggested maneuver that avoids the critical scenario, in response to identifying a critical scenario involving the remote connected vehicle and the unconnected vehicle at the future time. The suggested maneuver may be transmitted to the remote connected vehicle directly from ego vehicle or any intermediaries between the ego vehicle and the remote connected vehicle. The suggested maneuver may be in the form of a proxy MM or any other kind of digital message. The suggested maneuver may be continuously transmitted to the remote connected vehicle in case of, for example, poor signal propagation or updates to the suggested maneuver. Continuous transmission may continue until the critical scenario is no longer likely to occur.

Figure 4:
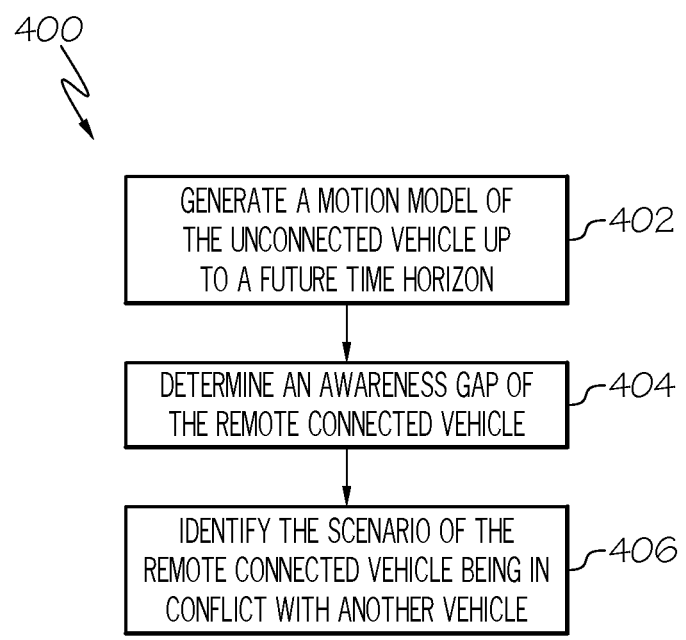
FIG. 4 depicts an illustrative method for identifying a critical scenario, according to one or more embodiments shown and described herein.

Referring now to FIG. 4, an illustrative method 400 for identifying a critical scenario is depicted. The method 400 may be performed by an ego vehicle, which may be a connected vehicle 102 that engages in workflow 100 and method 300 described above. Method 400 may correspond to block 306 discussed above. Identifying one or more critical scenarios of the remote connected vehicle being in conflict with the ego vehicle and/or one or more unconnected vehicles or objects at the future time may comprise block 402, wherein the ego vehicle generates a motion model of the remote connected vehicle up to a future time horizon. The motion model may be based on the information about the one or more unconnected vehicles or objects, such as information collected in block 302. The future time horizon is a window of time that may be modeled, of which the future time is a part. For example, the ego vehicle may generate a motion model of the one or more unconnected vehicles or objects for the remote connected vehicle for 30 seconds into the future.

To generate a motion model, the ego vehicle may fuse the information from block 302 and the messages from block 304 into a single data set and feed the data set to the dynamics estimation module of the ego vehicle. The dynamics estimation module may predict the trajectory of each unconnected vehicle or object via any predictive algorithm such as, for example, Kalman filtering. The dynamics estimation module may also predict conflict between sets of vehicles and/or objects. Conflicts between sets of vehicles or objects may include unconnected and/or connected vehicles or objects that have predicted trajectories that intersect at the same period of time (referred to herein as "critical scenarios").

Identifying one or more critical scenarios of the remote connected vehicle being in conflict with the ego vehicle and/or one or more unconnected vehicles or objects at the future time may also comprise block 404, wherein the ego vehicle determines an awareness gap of the remote connected vehicle. The awareness gap determination may be based on the messages received from the connected vehicle, such as the messages received in block 304. The awareness estimation module of the ego vehicle may receive as input the information from block 302 and the messages from block 304 as well as the output from the dynamics estimation module, which may include the predicted trajectory of vehicles and potentially conflicting vehicles.

Referring still to block 404, the awareness estimation module may feed the three sets of input data to an algorithm for estimating occlusions of the remote connected vehicle. The occlusion estimation algorithm may configured to determine an area that is likely to be occluded from the sensors of the remote connected vehicle. The occlusion estimation algorithm may be based on a geometric learning algorithm, a machine learning algorithm, and/or the like. For example, an machine learning algorithm may be trained with the messages from the remote connected vehicle such that the vehicles described in the messages are labeled as "aware". The trained machine learning algorithm may then receive the information from the ego vehicle such that the vehicles described in the information are classified as "aware" or "unaware" (i.e., the remote connected vehicle is aware or unaware of the vehicle). A vehicle that is classified as "unaware" may be determined to be located in the occlusion area of the remote connected vehicle.

Identifying one or more critical scenarios of the remote connected vehicle being in conflict with the ego vehicle and/or one or more unconnected vehicles or objects at the future time may further comprise block 406, wherein the ego vehicle identifies one or more critical scenarios of the remote connected vehicle being in conflict with the ego vehicle and/or the one or more unconnected vehicles or objects based on a comparison of the motion model and the awareness gap. The motion model includes trajectories of vehicles or objects that the ego vehicle and/or other connected vehicles have identified. The awareness gap includes the identified set of vehicles that the remote connected vehicle is unaware of and/or areas that the remote connected vehicle would be unaware of a vehicle (e.g., behind another vehicle). Comparing the motion model and the awareness gap may include identifying when and which vehicles may become occluded (i.e., unaware) to the sensors of the remote connected vehicle. For example, the remote connected vehicle may be aware of a first and a second unconnected vehicles or objects at a first time point, but at the second time point the first unconnected vehicle or object may be positioned beside the second unconnected vehicle or object such that it is in the occluded area respective to the remote connected vehicle and the remote connected vehicle is no longer aware of the first unconnected vehicle or object. Comparing the motion model and the awareness gap may also include identifying a maneuver from the remote connected vehicle that would put it in conflict with a vehicle that it is or is not aware of. Continuing with the previous example, the ego vehicle may identify a maneuver from the remote connected vehicle when the remote connected vehicle has activated its turning indicator and/or transmitted a MM message to indicate that it will be changing lanes to the same lane in which the first unconnected vehicle or object is located. A conflict is likely to occur between the first unconnected vehicle or object and the remote connected vehicle because they may be at or near the same location at the same time point.

Figure 5A:
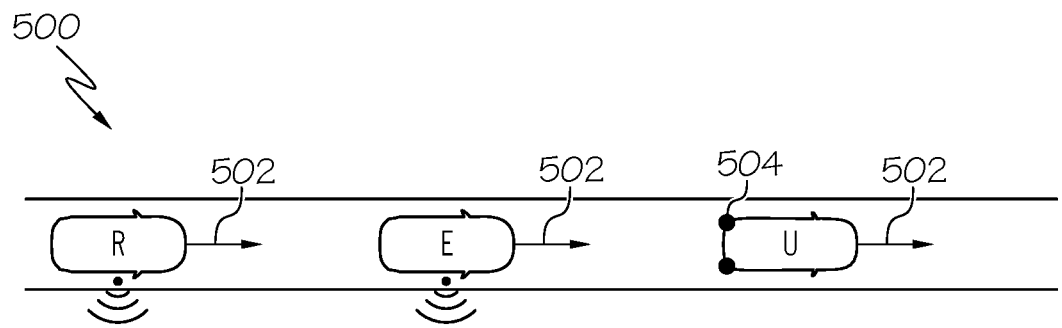
FIG. 5A depicts an illustrative scenario involving the ego vehicle, according to one or more embodiments shown and described herein.

Referring now to FIG. 5A, an illustrative scenario 500 involving the ego vehicle E is depicted. Ego vehicle E is a connected vehicle (e.g., connected vehicle 102) and is on a road with an unconnected vehicle U and a remote connected vehicle R (e.g., remote connected vehicle 122). The ego vehicle E may collect information about the unconnected vehicle U. For example, LIDAR sensors of the ego vehicle E may identify the unconnected vehicle U and determine its speed, direction, predicted trajectory, position, size, and/or any other attribute of the unconnected vehicle U. The ego vehicle E may determine the unconnected vehicle U is an unconnected vehicle based on a lack of communication from the unconnected vehicle U. For example, nearby connected vehicles (e.g., remote connected vehicle R) may periodically send messages (e.g., BSMs) about themselves that the ego vehicle E may receive. If the ego vehicle E has not received messages from a vehicle, the ego vehicle E may assume that the vehicle is unconnected. In this scenario 500, the ego vehicle E may collect information that includes the trajectory 502 and the braking indicators 504 of the unconnected vehicle U. The unconnected vehicle U is unconnected because it is not transmitting.

Figure 5B:
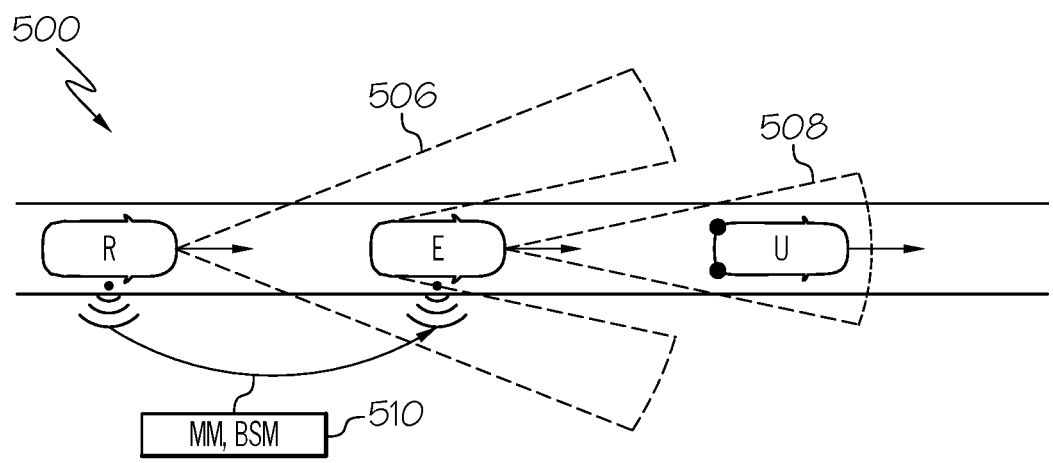
FIG. 5B depicts an illustrative scenario wherein the remote connected vehicle shares information with the ego vehicle, according to one or more embodiments shown and described herein.

Referring now to FIG. 5B, an illustrative scenario 500 wherein the remote connected vehicle R shares information with the ego vehicle E is depicted. The ego vehicle E may receive messages 510 from the remote connected vehicle R. The messages 510 may include an MM indicating the future movement of the remote connected vehicle R and a BSM indicating current information about the remote connected vehicle R. For example, the messages 510 from the remote connected vehicle R may identify the remote connected vehicle R and provide its speed, trajectory, position, size, and/or any other attribute of the remote connected vehicle R.

After receiving the sensor information and the messages 510 from the remote connected vehicle R, the ego vehicle E generates a motion model of the remote connected vehicle R up to a future time horizon. The motion model may be based on the sensor information and/or the messages 510. The future time horizon is a window of time that may be modeled, of which the future time is a part. For example, the ego vehicle E may generate a motion model of the unconnected vehicle U for the remote connected vehicle R for 30 seconds into the future.

To generate the motion model, the ego vehicle E may fuse the sensor information and the messages 510 into a data set and feed the data set to the dynamics estimation module of the ego vehicle E. The dynamics estimation module may predict the trajectory of the unconnected vehicle U. Then, the ego vehicle E determines an awareness gap of the remote connected vehicle R. The awareness gap determination may be based on the messages 510 and/or the sensor information. The awareness estimation module of the ego vehicle E may receive as input the sensor information and the messages 510 as well as the output from the dynamics estimation module, which may include the predicted trajectory of the unconnected vehicle U. In the scenario 500, the motion model may predict that the unconnected vehicle U is going to continue decelerating because the sensor information identified the braking indicators 504 of the unconnected vehicle U. The motion model may also predict that the remote connected vehicle R is going to continue on its current trajectory.

The awareness estimation module of the ego vehicle E may use the three sets of input data estimate occlusions of the remote connected vehicle R. That is, the awareness estimation module may estimate areas likely to be occluded from the sensors of the remote connected vehicle R. The messages 510 may indicate that the remote connected vehicle R is aware of the ego vehicle E. Because the sensor information of the ego vehicle E indicates the presence of the unconnected vehicle U, the ego vehicle E may determine that the unconnected vehicle U is in an occluded area and that the remote connected vehicle R is unaware of the unconnected vehicle U. The ego vehicle E may conclude that it has a view 508 and the remote connected vehicle R has a view 506 with an awareness gap wherein the ego vehicle E is occluding the unconnected vehicle U from the remote connected vehicle R.

Figure 5C:
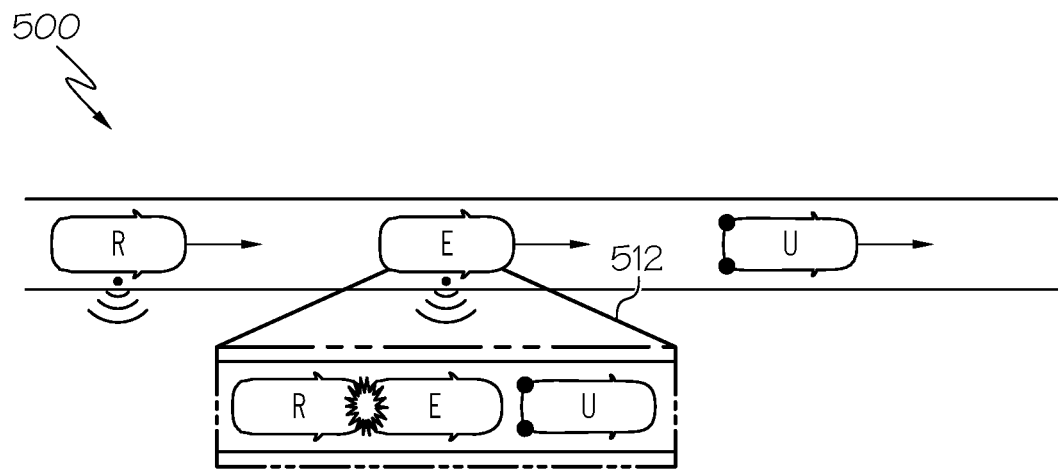
FIG. 5C depicts an illustrative scenario wherein the ego vehicle determines a critical scenario, according to one or more embodiments shown and described herein.

Referring now to FIG. 5C, an illustrative scenario 500 wherein the ego vehicle E determines a critical scenario 512 is depicted. After receiving sensor information and receiving messages 510 from the remote connected vehicle R, the ego vehicle E may identify one or more critical scenarios involving the remote connected vehicle R being in conflict with the ego vehicle E and/or the unconnected vehicle U at a future time based on the sensor information and the messages 510. In the scenario 500, the ego vehicle E identifies a critical scenario 512 wherein the unconnected vehicle U continues to decelerate and remote connected vehicle R continues on its current trajectory as determined by the motion model created by the ego vehicle E. The critical scenario 512 identifies that the remote connected vehicle R may come into conflict with the ego vehicle E because the remote connected vehicle R may not respond to the deceleration of the unconnected vehicle U because it is occluded by the ego vehicle E. That is, a conflict is likely to occur between the remote connected vehicle R and the ego vehicle E because they may be at the same location at the same time point.

Figure 5D:
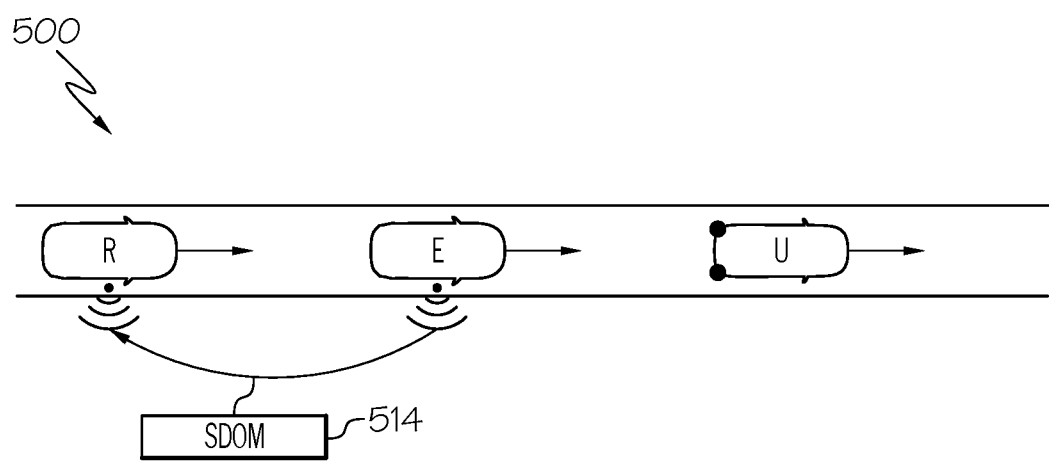
FIG. 5D depicts an illustrative scenario wherein the ego vehicle shares information with the remote connected vehicle, according to one or more embodiments shown and described herein.

Referring now to FIG. 5D, an illustrative scenario 500 wherein the ego vehicle E shares information with the remote connected vehicle R is depicted. The ego vehicle E may transmit to the remote connected vehicle R a message 514 in response to identifying the critical scenario 512 wherein the remote connected vehicle R being in conflict with the ego vehicle E at the future time. The message 514 may be an SDOM including information about the unconnected vehicle U to the remote connected vehicle R. The information may be the sensor information gathered by ego vehicle E and/or information determined by ego vehicle E. For example, the ego vehicle E may tell the remote connected vehicle R the rate of deceleration, the time of potential conflict with ego vehicle E, other vehicles in the awareness gap of the remote connected vehicle R, and/or any other information gathered and/or determined by the ego vehicle E for responding to the critical scenario 512.

Figure 6A:
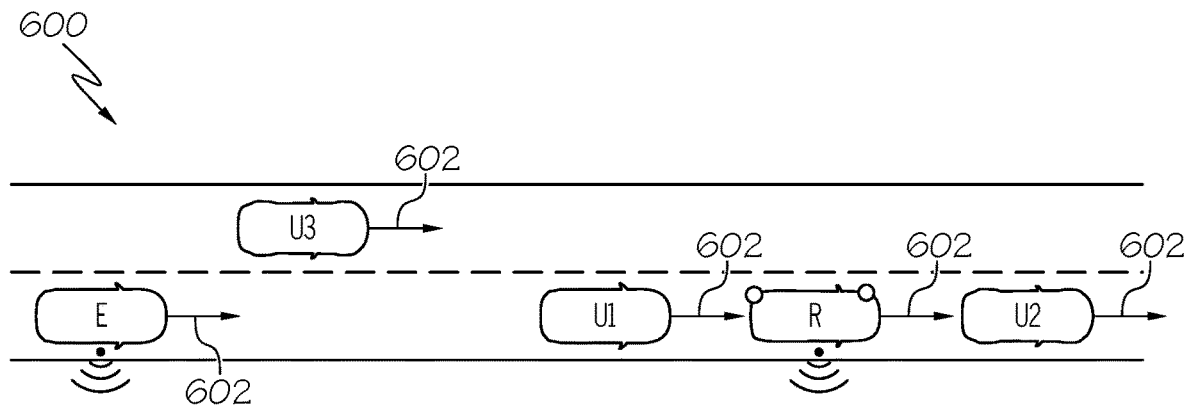
FIG. 6A depicts an illustrative scenario not involving the ego vehicle, according to one or more embodiments shown and described herein.

Referring now to FIG. 6A, an illustrative scenario 600 not involving the ego vehicle E is depicted. Ego vehicle E is a connected vehicle (e.g., connected vehicle 102) and is on a road with unconnected vehicles U1, U2, U3 and a remote connected vehicle R (e.g., remote connected vehicle 122). The ego vehicle E may collect information about the unconnected vehicles that the ego vehicle E has a view of. For example, a LIDAR sensors of the ego vehicle E may identify the unconnected vehicles U1, U3 and determine their speed, direction, predicted trajectory, position, size, and/or any other attribute of the unconnected vehicles U1, U3. The ego vehicle E may determine the unconnected vehicles U1, U3 are unconnected vehicles based on a lack of communication from the unconnected vehicles U1, U3. For example, nearby connected vehicles (e.g., remote connected vehicle R) may periodically send messages (e.g., BSMs) about themselves that the ego vehicle E may receive. If the ego vehicle E has not received messages from a vehicle, the ego vehicle E may assume that the vehicle is unconnected. In this scenario 600, the ego vehicle E may collect information that includes the trajectory 602 of the unconnected vehicles U1, U3.

Figure 6B:
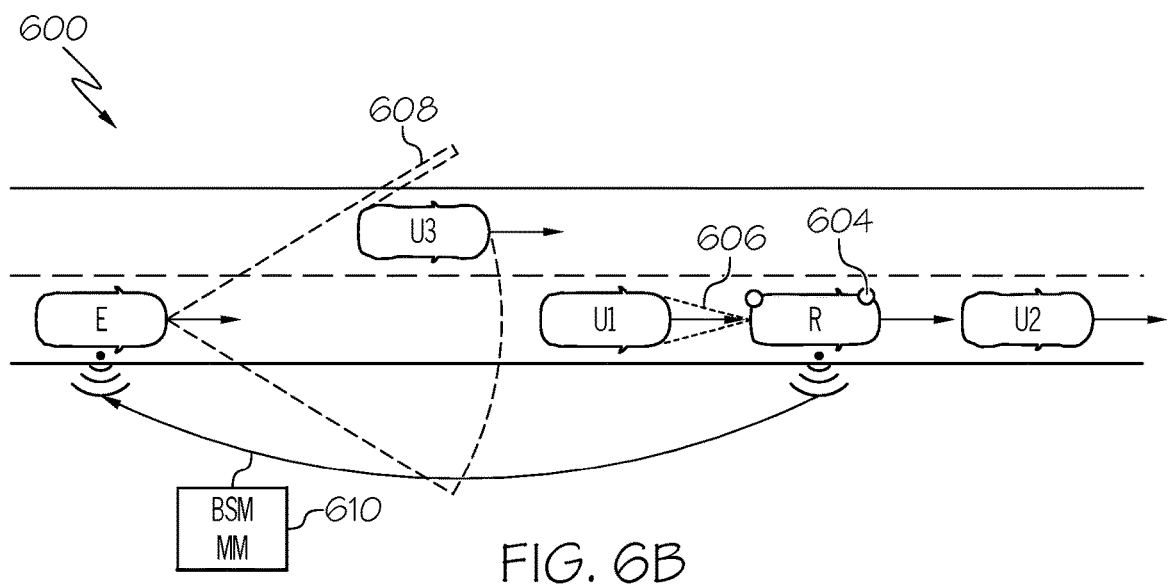
FIG. 6B depicts an illustrative scenario wherein the remote connected vehicle shares information with the ego vehicle, according to one or more embodiments shown and described herein.

Referring now to FIG. 6B, an illustrative scenario 600 wherein the remote connected vehicle R shares information with the ego vehicle E is depicted. The ego vehicle E may receive messages 610 from the remote connected vehicle R. The messages 610 may include an MM indicating the future movement of the remote connected vehicle R and a BSM indicating current information about the remote connected vehicle R. For example, the messages 610 from the remote connected vehicle R may identify the remote connected vehicle R and provide its speed, trajectory, position, size, and/or any other attribute of the remote connected vehicle R. The messages 610 may also provide that the remote connected vehicle R is going to change lanes, as also indicated by the turning indicators 604.

After receiving the sensor information and the messages 610 from the remote connected vehicle R, the ego vehicle E generates a motion model of the remote connected vehicle R up to a future time horizon. The motion model may be based on the sensor information and/or the messages 610. The future time horizon is a window of time that may be modeled, of which the future time is a part. For example, the ego vehicle E may generate a motion model of the unconnected vehicle U for the remote connected vehicle R for 30 seconds into the future.

To generate the motion model, the ego vehicle E may fuse the sensor information and the messages 610 into a data set and feed the data set to the dynamics estimation module of the ego vehicle E. The dynamics estimation module may predict the trajectory of the unconnected vehicles U1, U3. For example, the ego vehicle E may predict that the unconnected vehicle U3 may continue to accelerate at least in part based on the change in position of the unconnected vehicle U3, while the unconnected vehicle U1 and the remote connected vehicle R may continue to proceed on substantially the same trajectory.

Then, the ego vehicle E determines an awareness gap of the remote connected vehicle R. The awareness estimation module of the ego vehicle E may receive as input the sensor information and the messages 610 as well as the output from the dynamics estimation module, which may include the predicted trajectory of unconnected vehicles U1, U3. The awareness estimation module of the ego vehicle E may use the three sets of input data estimate occlusions of the remote connected vehicle R. That is, areas likely to be occluded from the sensors of the remote connected vehicle R. The messages 610 may indicate that the remote connected vehicle R is aware of the unconnected vehicles U1, U2. Because the sensor information of the ego vehicle E indicates the presence of the unconnected vehicles U1, U3, the ego vehicle E may determine that the unconnected vehicle U3 is in an occluded area and that the remote connected vehicle R is unaware of the unconnected vehicle U3. The ego vehicle E may conclude that it has a view 608 and the remote connected vehicle R has as view 606 with an awareness gap wherein the unconnected vehicle U1 is occluding the unconnected vehicle U3 from the remote connected vehicle R.

Figure 6C:
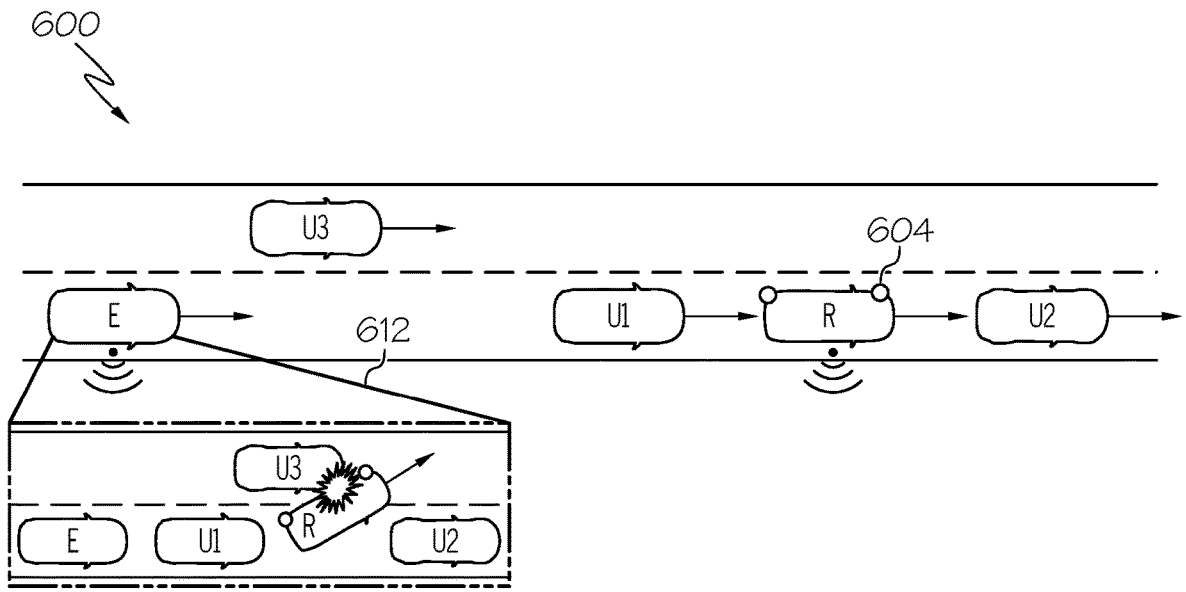
FIG. 6C depicts an illustrative scenario wherein the ego vehicle determines a critical scenario, according to one or more embodiments shown and described herein.

Referring now to FIG. 6C, an illustrative scenario 600 wherein the ego vehicle E determines a critical scenario 612 is depicted. After receiving sensor information and receiving messages 610 from the remote connected vehicle R, the ego vehicle E may identify one or more critical scenarios involving the remote connected vehicle R being in conflict with the ego vehicle E and/or the unconnected vehicles U1, U2, U3 at a future time based on the sensor information and/or the messages 610. In the scenario 600, the ego vehicle E identifies a critical scenario 612 wherein the unconnected vehicle U3 continues to accelerate and remote connected vehicle R continues to change lanes according to its turning indicators 604 as determined by the motion model created by the ego vehicle E. The critical scenario 612 identifies that the remote connected vehicle R may come into conflict with the unconnected vehicle U3 because the remote connected vehicle R may not respond to the acceleration of the unconnected vehicle U3 quickly enough. The remote connected vehicle R may not respond quickly enough because the unconnected vehicle U3 is occluded by the unconnected vehicle U1. That is, a conflict is likely to occur between the remote connected vehicle R and the unconnected vehicle U3 because they may be at the same location at the same time point.

In some embodiments, the ego vehicle E may also collect information about a second unconnected vehicle and determine whether the remote connected vehicle R is likely going to be in conflict with the second unconnected vehicle. For example, the second unconnected vehicle in scenario 600 may be unconnected vehicle U1. The ego vehicle E may identify the one or more scenarios of the remote connected vehicle R being in conflict with the second unconnected vehicle U1 based on the received messages from the remote connected vehicle R and the sensor information of the ego vehicle E. For example, the ego vehicle E may identify a critical scenario similar to the critical scenario 512 involving the remote connected vehicle R and the unconnected vehicles U1, U2. With critical scenarios having been identified for two unconnected vehicles U1, U3 with the remote connected vehicle R, the ego vehicle E may determine a criticality level for each critical scenario. The level of criticality for a critical scenario may be based on one or more factors including the time of the critical scenario, attributes of the unconnected vehicles, and/or response from the remote connected vehicle R. For example, the critical scenario 612 between the remote connected vehicle R and the unconnected vehicle U3 may be considered more critical because the unconnected vehicle U3 is traveling faster than the unconnected vehicle U1 and thus presents a greater risk.

Figure 6D:
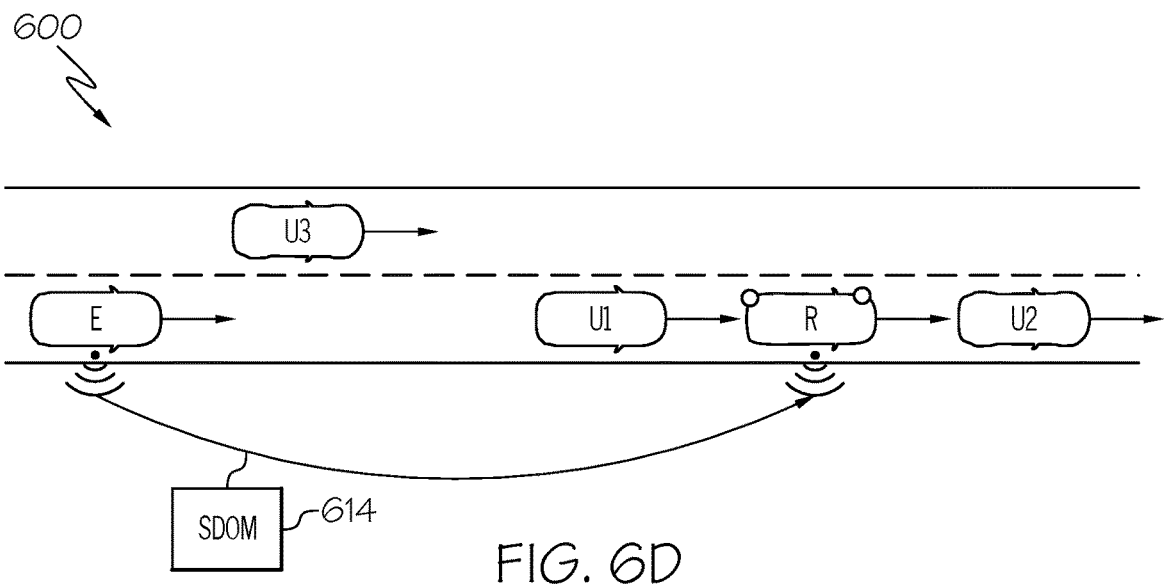
FIG. 6D depicts an illustrative scenario wherein the ego vehicle shares information with the remote connected vehicle, according to one or more embodiments shown and described herein.

Referring now to FIG. 6D, an illustrative scenario 600 wherein the ego vehicle E shares information with the remote connected vehicle R is depicted. The ego vehicle E may transmit to the remote connected vehicle R a message 614 in response to identifying the critical scenario 612 wherein the remote connected vehicle R being in conflict with the ego vehicle E at the future time. The message 614 may be an SDOM including information about the unconnected vehicle U3 that the remote connected vehicle R is unaware of. The information may be the sensor information gathered by ego vehicle E and/or information determined by the ego vehicle E. For example, the ego vehicle E may tell the remote connected vehicle R the rate of acceleration, the time of potential conflict with the remote connected vehicle R, other vehicles in the awareness gap of the remote connected vehicle R, and/or any other information gathered and/or determined by the ego vehicle E for responding to the critical scenario 612.

In embodiments that determine a criticality level between multiple critical scenarios, once criticality levels have been determined, the ego vehicle E may send messages to the remote connected vehicle R concerning each unconnected vehicle U1, U3 in the critical scenarios in an order based on criticality level. For example, the ego vehicle E may transmit a second message including information about the unconnected vehicle U1 to the remote connected vehicle R, wherein the first message is transmitted before the second message in response to the criticality level of the critical scenario 612 being greater than the criticality level of the critical scenario involving the unconnected vehicle U1.

In embodiments that determine a criticality level between multiple critical scenarios, once criticality levels have been determined, the ego vehicle E may also determine a transmission rate of messages based on the criticality level. The level of criticality for a scenario may be based on one or more factors including time of the scenario, attributes of the unconnected vehicles, and/or anticipated response from the remote connected vehicle R. For example, the scenario may be considered more critical than a scenario involving unconnected vehicle U1 because the unconnected vehicle U3 has a higher acceleration rate. Messages about the unconnected vehicles U1, U3 likely to be involved in the one or more critical scenarios may be transmitted to the remote connected vehicle R at a base rate (e.g., once per second). The transmission rate may be increased if the criticality level of the scenario corresponding to the message is above a predetermined threshold level.

In some embodiments, the ego vehicle E may also generate a suggested maneuver that avoids the critical scenario 612, in response to identifying the critical scenario 612. The suggested maneuver may be in the form of a proxy MM or any other kind of digital message. The suggested maneuver may be continuously transmitted to the remote connected vehicle R in case of, for example, poor signal propagation or updates to the suggested maneuver. Continuous transmission may continue until the critical scenario is no longer likely.

It should now be understood that embodiments disclosed herein include vehicles, methods, and non-transitory computer-readable mediums for sensor sharing based on criticality. In embodiments disclosed herein, an ego vehicle that is a connected vehicle may collect information about unconnected vehicles that it can sense and receive messages from nearby connected vehicles. The ego vehicle may identify one or more scenarios of the connected vehicles being in conflict with another vehicle (connected and/or unconnected vehicle) at a future time. In some embodiments, the ego vehicle may also determine a critical level of each of the one or more scenarios. The ego vehicle may transmit information about the vehicles with which the connected vehicles may be involved in a critical scenario. The transmission rate and/or order of each message may be based on the criticality level of the critical scenario that each message describes.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining embodiments of the present disclosure, it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A vehicle comprising:
   a controller programmed to perform operations comprising:
   collecting information about an unconnected vehicle;
   receiving messages from another connected vehicle;
   predicting motions of the unconnected vehicle and the another connected vehicle based on the information about the unconnected vehicle and the messages;
   estimating an occlusion area of the another connected vehicle based on the predicted motions of the unconnected vehicle and the another connected vehicle and an occlusion estimation algorithm, the messages including a position of an object, and the occlusion area being an area blocked by the object from a field of view of sensors of the another connected vehicle;
   identifying a scenario of the another connected vehicle being in conflict with the vehicle or the unconnected vehicle at a future time based on determining whether the unconnected vehicle is within the estimated occlusion area; and
   in response to identifying the scenario of the another connected vehicle being in conflict with the vehicle or the unconnected vehicle at the future time, transmitting a first message including the information about the unconnected vehicle to the another connected vehicle.

2. The vehicle of claim 1, wherein the information about the unconnected vehicle includes at least one of speed, direction, predicted trajectory, position, and size.

3. The vehicle of claim 1, wherein the messages from the another connected vehicle include one or more objects perceived from a sensor of the another connected vehicle.

4. The vehicle of claim 1, wherein identifying the scenario of the another connected vehicle being in conflict with the vehicle or the unconnected vehicle at the future time comprises:
   generating a motion model of the unconnected vehicle up to a future time horizon based on the information about the unconnected vehicle, wherein the future time is within the future time horizon;
   determining an awareness gap of the another connected vehicle based on the messages from the another connected vehicle; and
   identifying the scenario of the another connected vehicle being in conflict with the vehicle or the unconnected vehicle based on a comparison of the motion model and the awareness gap.

5. The vehicle of claim 4, wherein determining the awareness gap comprises:
determining the occlusion area of the another connected vehicle based on the messages from the another connected vehicle.

6. The vehicle of claim 1, wherein the controller is programmed to perform operations further comprising:
collecting information about another unconnected vehicle;
determining whether the another connected vehicle is going to be in another scenario of the another connected vehicle being in conflict with the another unconnected vehicle based on the messages from the another connected vehicle and the information about the another unconnected vehicle;
determining a criticality level for the scenario and the another scenario in response to determining that the another connected vehicle is going to be in the another scenario; and
transmitting a second message including information about the another unconnected vehicle to the another connected vehicle, wherein the second message is transmitted before the first message in response to the criticality level of the another scenario being greater than the criticality level of the scenario.

7. The vehicle of claim 1, wherein the controller is programmed to perform operations further comprising:
determining a criticality level for the scenario;
determining a transmission rate of the first message based on the criticality level; and
transmitting the first message according to the transmission rate.

8. The vehicle of claim 7, wherein determining the criticality level for the scenario is based on a predicted acceleration rate of the another connected vehicle for responding to the scenario.

9. The vehicle of claim 1, wherein the controller is programmed to perform operations further comprising:
in response to identifying the scenario of the another connected vehicle being in conflict with the vehicle or the unconnected vehicle at the future time, generating a suggested maneuver that avoids the scenario; and
transmitting the suggested maneuver to the another connected vehicle.

10. A method comprising:
collecting, with a sensor of a connected vehicle, information about an unconnected vehicle;
receiving, with a network connectivity module of the connected vehicle, messages from another connected vehicle;
predicting motions of the unconnected vehicle and the another connected vehicle based on the information about the unconnected vehicle and the messages;
estimating an occlusion area of the another connected vehicle based on the predicted motions of the unconnected vehicle and the another connected vehicle and an occlusion estimation algorithm, the messages including a position of an object, and the occlusion area being an area blocked by the object from a field of view of sensors of the another connected vehicle;
identifying, with a controller of the connected vehicle, a scenario of the another connected vehicle being in conflict with the connected vehicle or the unconnected vehicle at a future time based on determining whether the unconnected vehicle is within the estimated occlusion area; and
in response to identifying the scenario of the another connected vehicle being in conflict with the connected vehicle or the unconnected vehicle at the future time, transmitting, with the network connectivity module of the connected vehicle, a first message including the information about the unconnected vehicle to the another connected vehicle.

11. The method of claim 10, wherein the information about the unconnected vehicle includes at least one of speed, direction, predicted trajectory, position, and size.

12. The method of claim 10, wherein the messages from the another connected vehicle include one or more objects perceived from a sensor of the another connected vehicle.

13. The method of claim 10, wherein identifying the scenario of the another connected vehicle being in conflict with the connected vehicle or the unconnected vehicle at the future time comprises:
generating a motion model of the unconnected vehicle up to a future time horizon based on the information about the unconnected vehicle, wherein the future time is within the future time horizon;
determining an awareness gap of the another connected vehicle based on the messages from the another connected vehicle; and
identifying the scenario of the another connected vehicle being in conflict with the connected vehicle or the unconnected vehicle based on a comparison of the motion model and the awareness gap.

14. The method of claim 13, wherein determining the awareness gap comprises:
determining the occlusion area of the another connected vehicle based on the messages from the another connected vehicle.

15. The method of claim 10, further comprising:
collecting, with the sensor of the connected vehicle, information about another unconnected vehicle;
determining, with the controller of the connected vehicle, whether the another connected vehicle is going to be in another scenario of the another connected vehicle being in conflict with the another unconnected vehicle based on the messages from the another connected vehicle and the information about the another unconnected vehicle;
determining, with the controller of the connected vehicle, a criticality level for the scenario and the another scenario in response to determining that the another connected vehicle is going to be in the another scenario; and
transmitting, with the network connectivity module of the connected vehicle, a second message including information about the another unconnected vehicle to the another connected vehicle, wherein the second message is transmitted before the first message in response to the criticality level of the another scenario being greater than the criticality level of the scenario.

16. The method of claim 10, further comprising:
determining a criticality level for the scenario;
determining a transmission rate of the first message based on the criticality level; and
transmitting the first message according to the transmission rate.

17. The method of claim 16, wherein determining the criticality level for the scenario is based on a predicted acceleration rate of the another connected vehicle for responding to the scenario.

18. The method of claim 10, further comprising:
in response to identifying the scenario of the another connected vehicle being in conflict with the connected vehicle or the unconnected vehicle at the future time, generating a suggested maneuver that avoids the scenario; and
transmitting the suggested maneuver to the another connected vehicle.

19. A non-transitory computer-readable medium having machine-readable instructions that, when executed by a controller, cause the controller to perform operations comprising:
collecting, with a sensor of a connected vehicle, information about an unconnected vehicle;
receiving, with a network connectivity module of the connected vehicle, messages from another connected vehicle;
predicting motions of the unconnected vehicle and the another connected vehicle based on the information about the unconnected vehicle and the messages;
estimating an occlusion area of the another connected vehicle based on the predicted motions of the unconnected vehicle and the another connected vehicle and an occlusion estimation algorithm, the messages including a position of an object, and the occlusion area being an area blocked by the object from a field of view of sensors of the another connected vehicle;
identifying, with the controller of the connected vehicle, a scenario of the another connected vehicle being in conflict with the connected vehicle or the unconnected vehicle at a future time based on determining whether the unconnected vehicle is within the estimated occlusion area; and
in response to identifying the scenario of the another connected vehicle being in conflict with the connected vehicle or the unconnected vehicle at the future time, transmitting, with the network connectivity module of the connected vehicle, a first message including the information about the unconnected vehicle to the another connected vehicle.

20. The non-transitory computer-readable medium of claim 19, wherein the machine-readable instructions cause the controller to perform operations further comprising:
collecting, with the sensor of the connected vehicle, information about another unconnected vehicle;
determining, with the controller of the connected vehicle, whether the another connected vehicle is going to be in another scenario of the another connected vehicle being in conflict with the another unconnected vehicle based on the messages from the another connected vehicle and the information about the another unconnected vehicle;
determining, with the controller of the connected vehicle, a criticality level for the scenario and the another scenario in response to determining that the another connected vehicle is going to be in the another scenario; and
transmitting, with the network connectivity module of the connected vehicle, a second message including information about the another unconnected vehicle to the another connected vehicle, wherein the second message is transmitted before the first message in response to the criticality level of the another scenario being greater than the criticality level of the scenario.

* * * * *

UNITED STATES PATENT AND TRADEMARK OFFICE
CERTIFICATE OF CORRECTION

PATENT NO. : 12,172,668 B2
APPLICATION NO. : 17/555735
DATED : December 24, 2024
INVENTOR(S) : Sergei S. Avedisov, Onur Altintas and Takamasa Higuchi Page 1 of 1

It is certified that error appears in the above-identified patent and that said Letters Patent is hereby corrected as shown below:

In the Specification

In Column 7, Line(s) 37, delete "anmials" and insert --animals--, therefor.

In Column 7, Line(s) 43, after "send", insert --,--.

In Column 9, Line(s) 66, after "may", insert --be--.

In Column 10, Line(s) 4, before "machine learning", delete "an" and insert --a--, therefor.

Signed and Sealed this
Twenty-fifth Day of February, 2025

Coke Morgan Stewart
*Acting Director of the United States Patent and Trademark Office*